Figure 12:
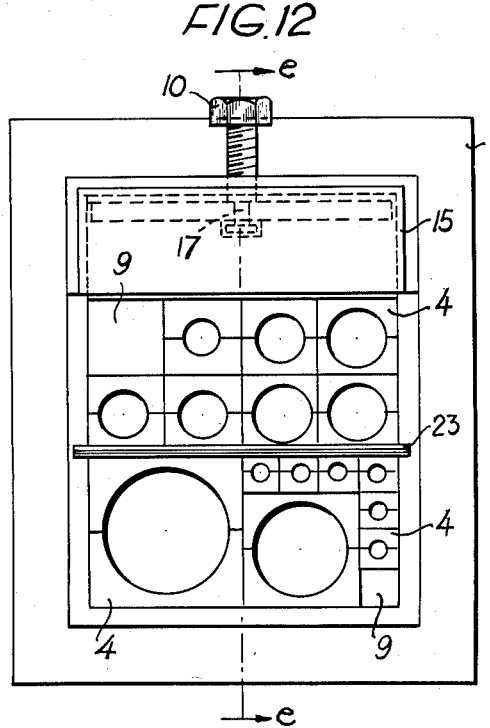

Jan. 24, 1956 — N. BRATTBERG — 2,732,226
PRESSURE-TIGHT PACKING ASSEMBLY FOR CONDUCTORS PASSING THROUGH A WALL
Filed April 20, 1953
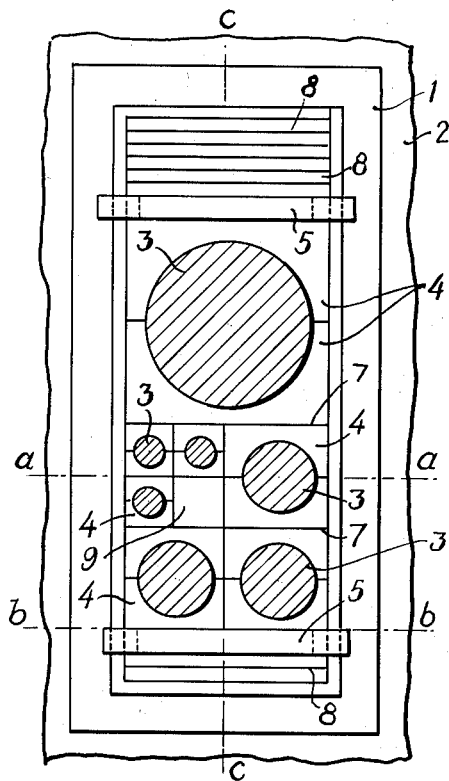
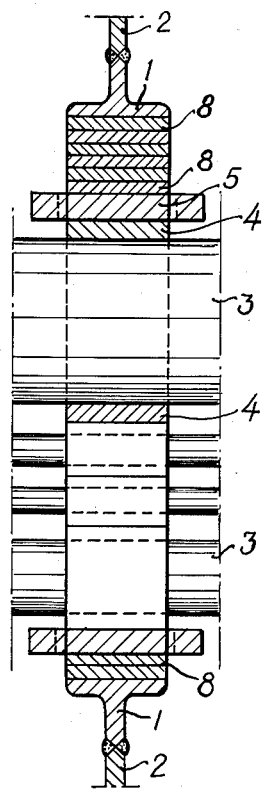
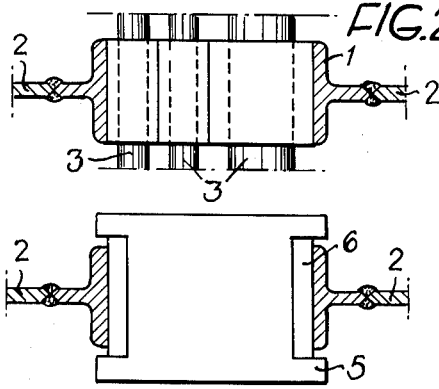
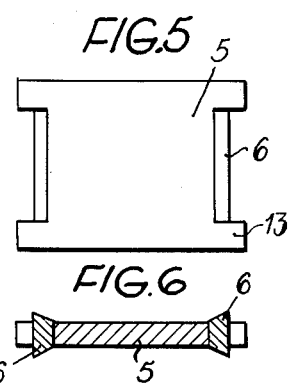
INVENTOR.
Nils Brattberg
BY
Young, Emery & Thompson
Attys.

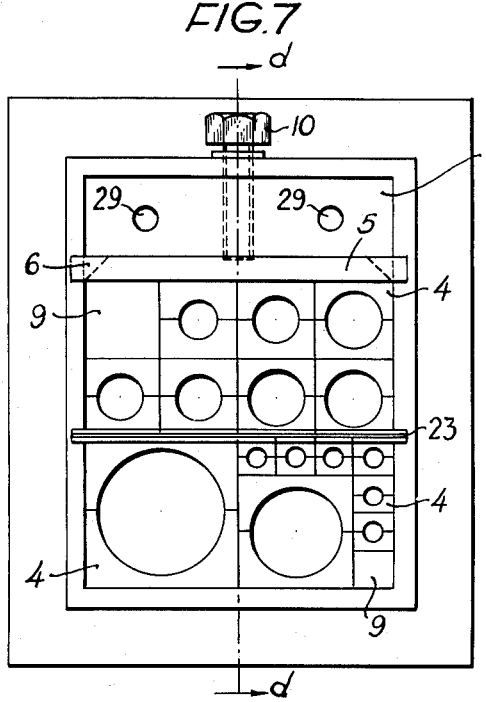
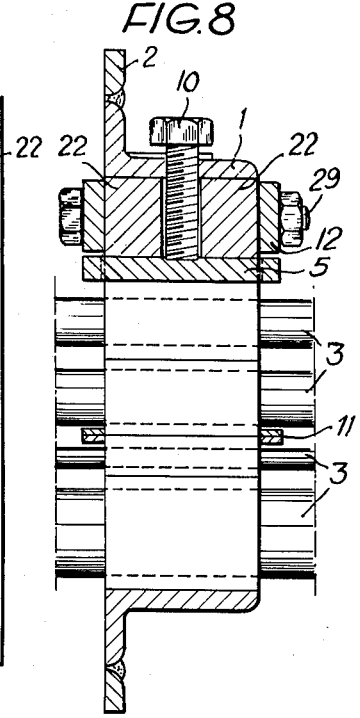
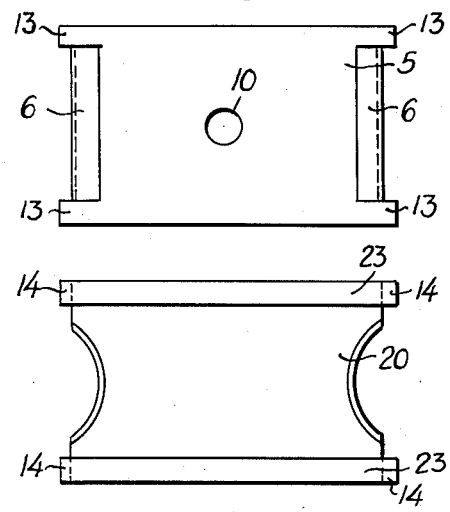
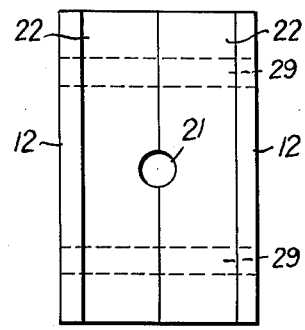

Jan. 24, 1956

N. BRATTBERG 2,732,226

PRESSURE-TIGHT PACKING ASSEMBLY FOR
CONDUCTORS PASSING THROUGH A WALL

Filed April 20, 1953

3 Sheets-Sheet 3

INVENTOR

Nils Brattberg

BY Young, Emery + Thompson

ATTORNEYS

United States Patent Office 2,732,226
Patented Jan. 24, 1956

2,732,226
PRESSURE-TIGHT PACKING ASSEMBLY FOR CONDUCTORS PASSING THROUGH A WALL

Nils Brattberg, Karlskrona, Sweden

Application April 20, 1953, Serial No. 349,693

Claims priority, application Sweden March 9, 1950

4 Claims. (Cl. 285—2)

This invention relates to a pressure-tight packing assembly for a plurality of conductors passing through a wall.

When a plurality of conductors, for instance electrical cables, tubes or the like, has to be drawn through a pressure-tight partition or wall, the following disadvantages appear with arrangements hitherto known. A bundle of leads has to be spread out over a considerable surface at the location of the passage. Difficulties arise for the effective sealing of each separate unit of the bundle and especially if the bundle of leads has to be replaced in part or entirely by other lead dimensions, expensive changes have to be made at the passages. The invention has for its object to diminish these disadvantages and in general to simplify the problems arising in connection with the mounting of the leads.

According to the present invention, the pressure-tight packing assembly consists of a short, rectangular tube and in part or entirely elastic gauge blocks, which gauge blocks are shaped with respect to the section of the respective conductors and according to a modulus system and arranged so as to fill up the spaces between the separate conductors as well as between the conductors and the tube, the modulus system being chosen such that the space within the rectangular tube may be substantially filled by blocks of equal or different sizes, the final pressure sealing being obtained between the conductors, the gauge blocks and the tube by compressing the gauge blocks and the conductors, and the free space obtained after the compression being filled with pressure-tight material.

It is, however, not plausible that the number of leads in all events exactly coincides with the maximum number for which the frame is adapted. The space, which owing to this fact may be left in the frame, may be utilized for future completing with further leads. Such space not utilized is filled with gauge blocks made according to the modulus system, suitably with square profiles. After the tube having been filled with leads and gauge blocks, all is pressed together within the tube, and the space then possibly being left is sealed. In this manner a pressure-tight packing assembly is obtained which permits combinations of all actual lead dimensions.

The device described may be provided with rigid plates on one or each side of the gauge blocks in which the cables are mounted, and these plates may be arranged so as to be compressed with a screw clamp or the like, whereafter blocks of elastic material are inserted into the free spaces between the plates and the frame obtained by the compression of the gauge blocks.

A free space may be provided between at least one such rigid plate arranged for the compression of the gauge blocks and one side of the frame, suitably a short side. The means for the compression of the gauge blocks may consists of a screw arranged in the frame perpendicular to the rigid plate and by which the plate is pressed against the gauge blocks. Thereafter the ultimate sealing of the conductor passage is obtained by arranging one or more elastic gauge blocks adapted for the modulus system. On either side of these last mentioned blocks in the longitudinal direction of the conductor passage, non-elastic plates may be provided. These plates as well as the elastic gauge block or gauge blocks may be provided with apertures for bolts extending in the longitudinal direction of the passage and by which the gauge block or blocks may be compressed so as to exert a high pressure on the gauge blocks in a direction perpendicular to the conductors. If the device, as suitably is the case, is provided with a screw at right angles to the rigid plate, two separate gauge blocks may be arranged between this plate and the frame, said blocks being shaped such that they can be placed in the space between plate and frame without interfering with the screw.

According to a modification of the last mentioned arrangement for the final sealing of the packing assembly, the frame is provided with two plates rigidly secured to each side of the frame in the longitudinal direction of the packing assembly and an elastic gauge block is fitted between them. A screw threaded into the frame acts as described above on a rigid plate which, however, in this case is located between said gauge block and the frame. By tightening the screw against the rigid plate, the said block is pressed against the gauge blocks for the conductor passage and at the same time against the plates secured to the frame so that the desired sealing is obtained.

In order to obtain an enforcement of the block arrangement in the device when using a great number of leads and blocks, it is suitable to arrange intermediate metallic stiffening plates which may be constructed with thin edges at their portions located between the gauge blocks within the frame. These plates are preferably provided with lugs extending outside the frame at its edges.

In the accompanying drawings some embodiments of the invention are shown. Fig. 1 is a view, partly in cross-section, of a conductor passage in a wall for a number of cables, Fig. 2 a section of the passage along the line a—a in Fig. 1, Fig. 3 a section along the line b—b in Fig. 1, and Fig. 4 a section along the line c—c in Fig. 1. Fig. 5 shows a detail of a compression plate and Fig. 6 a section of this plate.

Figure 13:
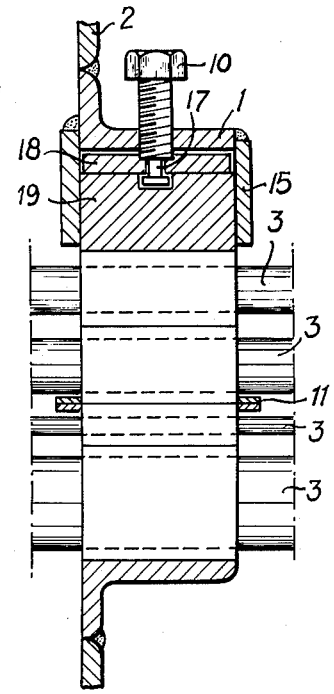

A second embodiment of the invention is shown in Figs. 7 and 8, Fig. 8 being a section along the line d—d in Fig. 7. Fig. 9 shows an intermediate compression disk, Fig. 10 the final sealing means, and Fig. 11 a stiffening washer in the device according to Figs. 7 and 8. Figs. 12 and 13 illustrate a third embodiment of the invention, Fig. 13 being a sectional view along the line e—e, Fig. 12.

In the drawing, numeral 2 denotes a pressure-tight metal sheet wall in which an aperture is provided for welding-in a rectangular frame 1. Through the frame passes a number of cables 3. Around each cable elastic gauge blocks 4 are provided in pairs. A space not occupied by cables is filled with a rectangular gauge block 9. In the frame 1, rigid plates 5 are provided at the edges of which, directed against the frame 1, members 6 of elastic material 6 are secured. For compressing the blocks 4 for the final sealing, screw clamps (not shown) are applied to the parts of the plates 5 extending beyond the frame 1 as shown in Fig. 4 and screwed together. The free space of the frame thus obtained is filled with elastic plates or layers 8. The pressure is then released by unscrewing the screw clamps which are then removed. The residual pressure in the elastic blocks is evenly distributed within the frame 1.

The plate 5 is provided with projecting corners 13 for the purpose of stiffening the assembly in order to make it stand high pressures. If the pressure difference between the two sides of the wall 2 is considerable, the equilibrium between the pressure force against the blocks within the frame 1 and the friction force between the inside of the frame 1 and the blocks may be disturbed with the effect that the gauge blocks 4, 9 and plates 5, 8 are urged through the frame 1. When in such case the projecting corners of the plates 5 have reached the edge of the frame 1, the friction force is increased in that the two sides of the plates 5 increase the effective friction surface and thus equilibrium is reestablished. The ability of the passage to take up higher pressures is further increased, if such plates 5 are provided parallel to each other between the gauge blocks 4, for instance at the places indicated at 7.

In the embodiment of the invention shown in Figs. 7 to 11, the frame 1 has a bore for a screw 10 perpendicular to one of its sides. This screw 10 is unscrewed when the cables are to be inserted, and the compression plate 5 is moved upwards close to the upper flat internal side of the frame 1. To the plate 5 triangular elastic parts 6 are rigidly fastened so as to tighten between the edges of the plate and the inner side of the frame 1. When inserting the conductors, the elastic gauge blocks 4 adapted to conductor diameters in question and the rectangular elastic gauge blocks 9 for conductor space not ultilized, stiffening plates or washers 20 (Fig. 11) are preferably arranged at suitable locations. By means of the screw 10 and the plate 5 the conductors and gauge blocks are then compressed so that they will take up the position indicated in Figs. 7 and 8. Thus a free space is obtained between the plate 5 and the upper short side of the frame 1. In order to fill this space and in order to further compress the gauge blocks 4 and 9 a final sealing is used. This sealing is shown in Fig. 10 and consists of two equal gauge blocks 22 of elastic material and two stiff plates 12. As shown in Fig. 8, these parts are fitted from opposite sides into the free space mentioned above. Recesses 21 are provided in the gauge blocks 22 for the screw 10. The gauge blocks 22 as well as the plates 12 have bores for bolts 29 provided for the final tightening. By tightening the two bolts 29, the plates 12 will compress the elastic gauge blocks 22. Due to the compression these blocks will exert a pressure both against the inside of the frame 1 and against the !pate 5 thus filling the space between the frame and the plate and providing for the tightening between the conductors 3 and the gauge blocks 4 and 9.

The stiffening washer shown in Fig. 11 is provided in order to increase the ability of the passage to take up pressure. This washer consists of a thin metal plate to which four flat irons 23 are welded so as to form lugs 14 extending outside the aperture in the frame. The edges of the washers facing the frame are provided with arc-shaped, sharpened recesses 11 in order to allow the elastic material of the gauge blocks to fill these recesses and provide for the effective tightening at the washer.

In order to decrease the number of different parts necessary for a passage according to the invention, the washer according to Fig. 11 may be substituted by a plate according to Fig. 9.

In the modification illustrated in Figs. 12 and 13, the conductors 3, gauge blocks 4 and 9 and washer are fitted in the frame 1 in a similar manner as described above.

The compression of the conductors 3 and gauge blocks 4, 9 is effected by means of the following arrangement. The upper part of the frame 1 is shaped as a downwardly open box by means of metal plates 15 and 16 welded to the ends of the frame. A plunger 18 and an elastic block 19 suitably fastened thereto are provided in this box. The plunger which substantially fills the cross-sectional area of the box is movable therein and can be pressed downwards or lifted by means of the screw 10. In Figs. 12 and 13, the conductors 3 and gauge blocks 4, 9 are loosely fitted in the frame. By tightening the screw 10 a compression of these parts is achieved and also a pressure-tight joint between the block 19, the plates 15 and 16 and the frame 1.

What I claim is:

1. A pressure-tight packing assembly for a plurality of conductors passing through a wall, comprising a short rectangular frame adapted to be inserted in the wall, at least partly elastic gauge blocks shaped with respect to the cross-section of the respective conductors and arranged to fill up the spaces between the separate conductors and the spaces between the conductors and the frame, said gauge blocks being dimensioned in accordance with a modulus system permitting said frame to be substantially filled by blocks of equal or different sizes, the gauge blocks being compressed to obtain sealing between themselves, the conductors and said frame, and a member tightly inserted in the space left between the inner sides of the frame and the compressed gauge blocks.

2. A pressure-tight packing assembly for a plurality of conductors passing through a wall, comprising a short rectangular frame adapted to be inserted in the wall, at least partly elastic gauge blocks shaped with respect to the cross-section of the respective conductors and arranged to fill up the spaces between the separate conductors and the spaces between the conductors and the frame, said gauge blocks being dimensioned in accordance with a modulus system permitting said frame to be substantially filled by blocks of equal or different sizes, the gauge blocks being compressed to obtain sealing between themselves, the conductors and said frame, an elastic member inserted in the space left between the inner sides of the frame and the compressed gauge blocks, means to exert pressure on said elastic member, and non-elastic plates provided on either side of said elastic member at the ends of said frame and adapted to limit extension of the elastic member longitudinally of the frame at the exertion of pressure on the elastic member.

3. A pressure-tight packing assembly as set forth in claim 2 and wherein said pressure exerting means comprises a bolt extending through said elastic member longitudinally of said frame.

4. A pressure-tight packing assembly as set forth in claim 2, wherein said non-elastic plates are rigidly secured to said frame and wherein said pressure exerting means comprises a plunger provided between said non-elastic plates and between a wall of said frame and said elastic member.

References Cited in the file of this patent

UNITED STATES PATENTS

| 1,133,976 | Kraus | Mar. 30, 1915 |
| 2,227,528 | Adler | Jan. 7, 1941 |
| 2,318,859 | Huguelet | May 11, 1943 |
| 2,417,260 | Morehouse | Mar. 11, 1947 |

FOREIGN PATENTS

| 538,730 | Great Britain | Aug. 14, 1941 |
| 544,618 | Great Britain | Apr. 21, 1942 |